United States Patent [19]
Wang

[11] Patent Number: 5,639,491
[45] Date of Patent: Jun. 17, 1997

[54] ARRANGEMENT OF OIL CYLINDERS FOR A PLASTIC INJECTING MACHINE

[75] Inventor: Jui Hsiang Wang, Tainan Hsien, Taiwan

[73] Assignee: HWA Chin Machinery Factory Co., Ltd., Tainan Hsien, Taiwan

[21] Appl. No.: 518,291

[22] Filed: Aug. 15, 1995

[51] Int. Cl.⁶ .................................................. B29C 45/54
[52] U.S. Cl. ........................ 425/550; 264/328.14; 425/557; 425/561; 425/587
[58] Field of Search ...................................... 425/557, 558, 425/559, 560, 561, 587, 550; 264/328.1, 328.14, 328.15

[56] References Cited

U.S. PATENT DOCUMENTS

| | | | |
|---|---|---|---|
| 2,333,601 | 2/1943 | Tucker | 425/587 |
| 3,259,943 | 7/1966 | Kolach et al. | 425/587 |
| 5,474,733 | 12/1995 | Koide et al. | 425/589 |

FOREIGN PATENT DOCUMENTS

| | | | |
|---|---|---|---|
| 2612449 | 9/1988 | France | 425/587 |
| 2-22025 | 1/1990 | Japan | 425/587 |

*Primary Examiner*—Jay H. Woo
*Assistant Examiner*—Joseph Leyson
*Attorney, Agent, or Firm*—Morton J. Rosenberg; David I. Klein

[57] ABSTRACT

An arrangement of oil cylinders of a plastic injecting machine is provided which positions a large oil cylinder and a small oil cylinder respectively on both the left and right sides of an oil cylinder base and a bearing base. The large and small oil cylinders are located at such a distance away from a material injecting cylinder that the oil seals of the four oil cylinders are not heated by the electric heaters that heat the material injecting cylinder. By this arrangement, the oil seals have a normal service life. In addition, an oil route plate is located on the bearing base to secure oil pipes formed of hard steel connected between the four oil cylinders and an oil pump, to keep oil flowing smoothly.

1 Claim, 5 Drawing Sheets

ARRANGEMENT OF OIL CYLINDERS FOR A PLASTIC INJECTING MACHINE

BACKGROUND OF THE INVENTION

This invention concerns an arrangement of oil cylinders for a plastic injecting machine. More particularly, the present invention is directed to an arrangement of four oil cylinders moving a material injecting cylinder, and in such a position to be far away enough from the material injecting cylinder to prevent the oil seals of the four oil cylinders from being heated by hot electric heaters of the material injecting cylinders used during injecting operation.

A conventional plastic injecting machine, shown in FIG. 5, has a double injecting oil cylinder base 1 on a work table 6, a double oil cylinder 2 consisting of a large diameter cylinder and a small diameter cylinder combined in series at a left and a right side of the oil cylinder base 1. The double oil cylinders 2 extend forward in parallel with a material injecting cylinder.

When in injecting operation, an oil motor 3 is started to rotate a screw rod in a bearing base 4, and an oil cylinder 5 is started to move the oil cylinder base 1 forward, with the piston rods of the two double oil cylinders 2 also moved forward at the same time with the bearing base 4. When the piston rods are retracted, the bearing base 4 is also moved back together therewith. Though the two double oil cylinders 2 can operate with proper pressure and speed needed for displacing the plastic material, they are located very near to the material injecting cylinder. The material injecting cylinder is encompassed by electric heaters, so the oil seals provided in the two double oil cylinders 2 are heated by those heaters to more than 250° C. during the injecting operation. Since common oil seals have a normal temperature resistance of 95° C., their service life will be shortened by exposure to such a high operating temperature.

SUMMARY OF THE INVENTION

An arrangement of oil cylinders for a plastic injecting machine is provided to prevent the oil seals of those oil cylinders from being heated by a material injecting cylinder having electric heaters to heat and melt plastic material and thereby allowing the oil seals to have a normal service life.

In the arrangement of the present invention, a large oil cylinder and a small oil cylinder are respectively positioned at a left and a right side of an oil cylinder base and a bearing base in a vertical orientation, and the piston rods of the four oil cylinders are coupled to the oil cylinder base to move together. The location of the four oil cylinders is at a distance that is far enough away from the material injecting cylinder so that the oil seals of the four oil cylinders are not heated by the electric heaters disposed around the material injecting cylinder.

BRIEF DESCRIPTION OF DRAWINGS

The invention will be better understood by reference to the accompanying Drawings, wherein.

DESCRIPTION OF THE PREFERRED EMBODIMENTS

Figure 1:
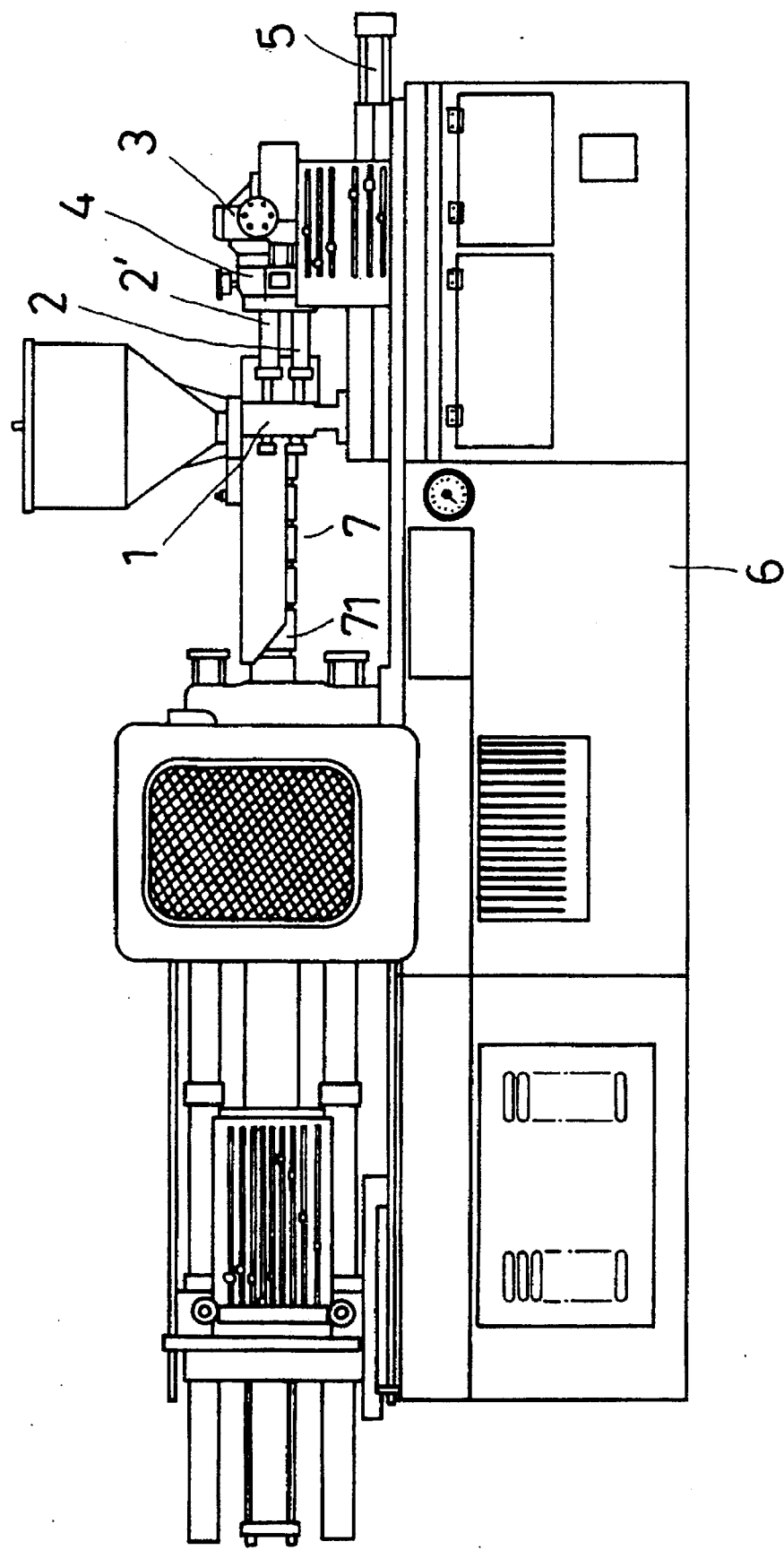
FIG. 1 is a side elevation view of a plastic injecting machine equipped with oil cylinders arranged according to the present invention.
Figure 2:
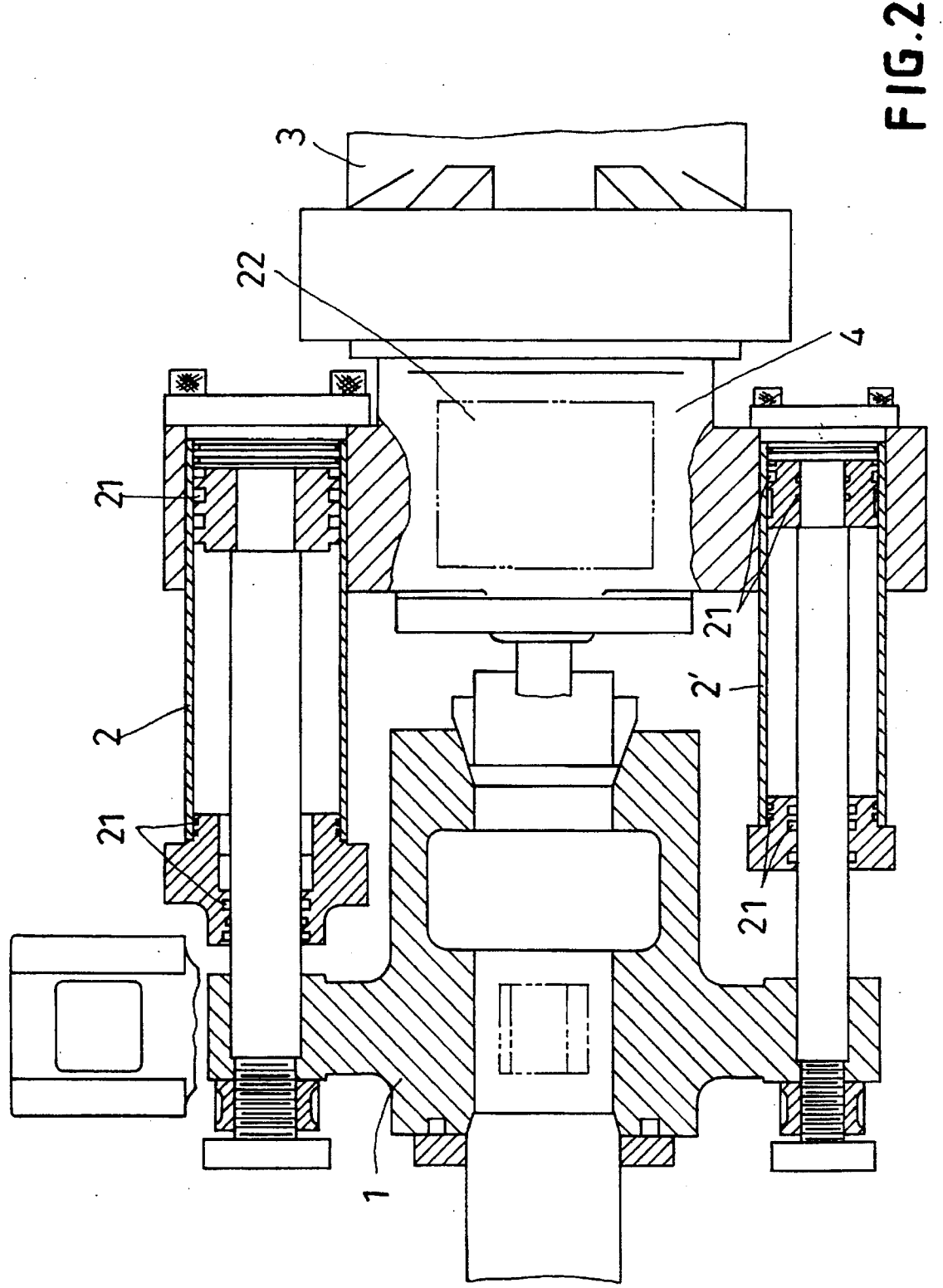
FIG. 2 is a partial cross-sectional view of the oil cylinder portion of a plastic injecting machine equipped according to the present invention.
Figure 3:
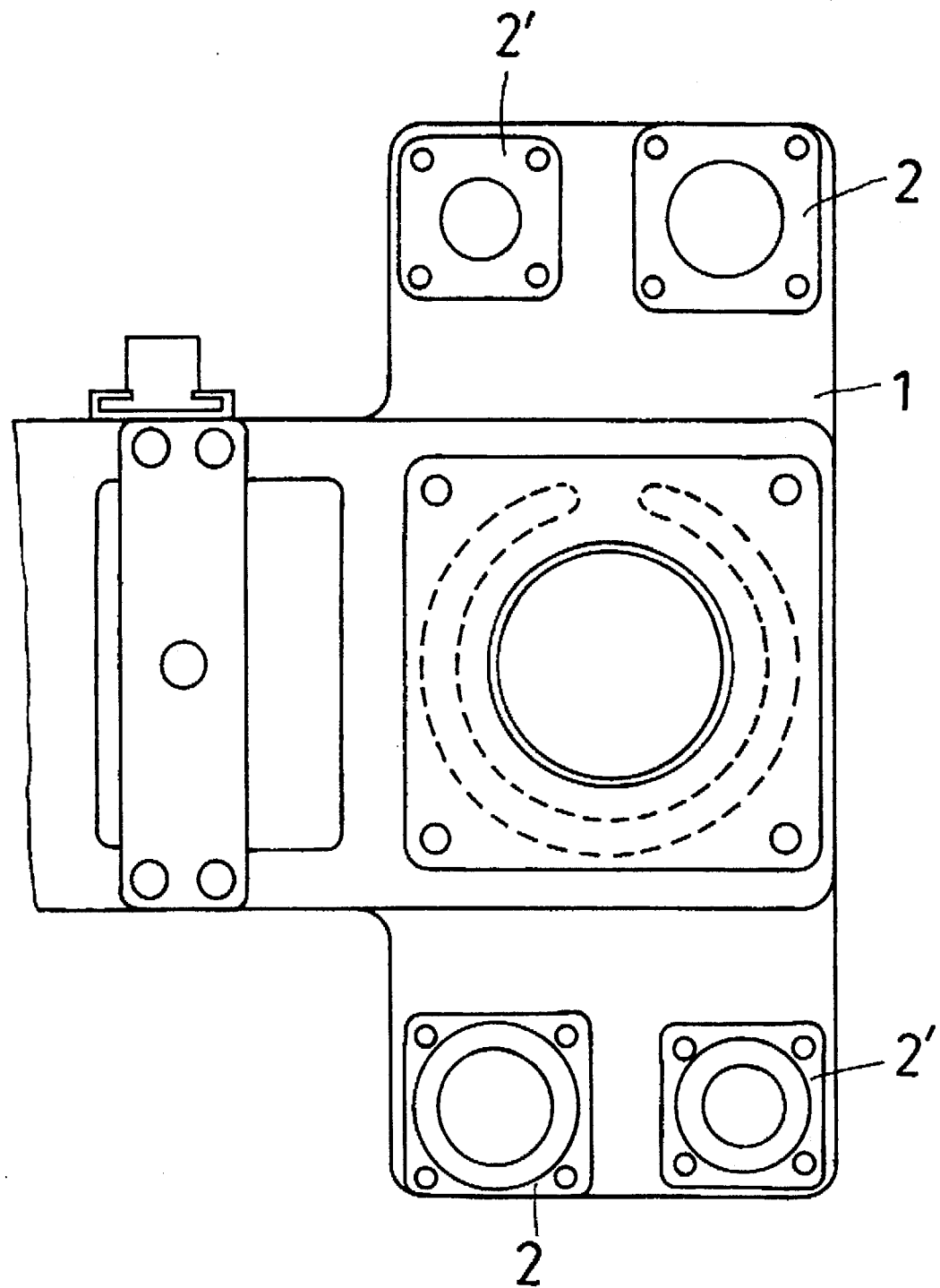
FIG. 3 is an end view of the oil cylinders arranged in a plastic injecting machine according to the present invention.
Figure 4:
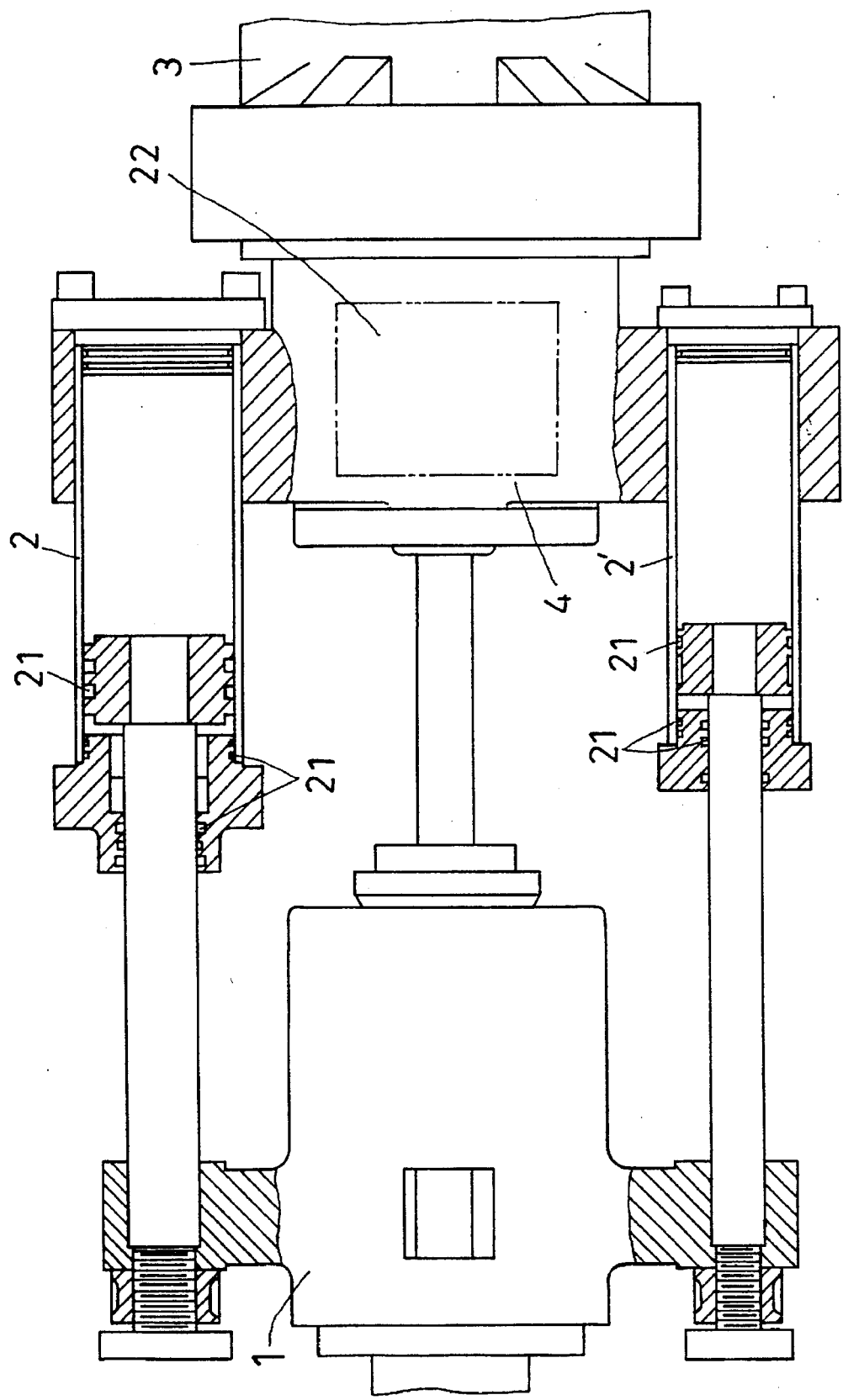
FIG. 4 is a partial cross-sectional plan view of the oil cylinders arranged in a plastic injecting machine according to the present invention showing the piston rods of the oil cylinders pushed forward together with an oil cylinder connecting base; and, FIG. 5 is a side elevation view of a conventional plastic injecting machine with oil cylinders.
Figure 5:
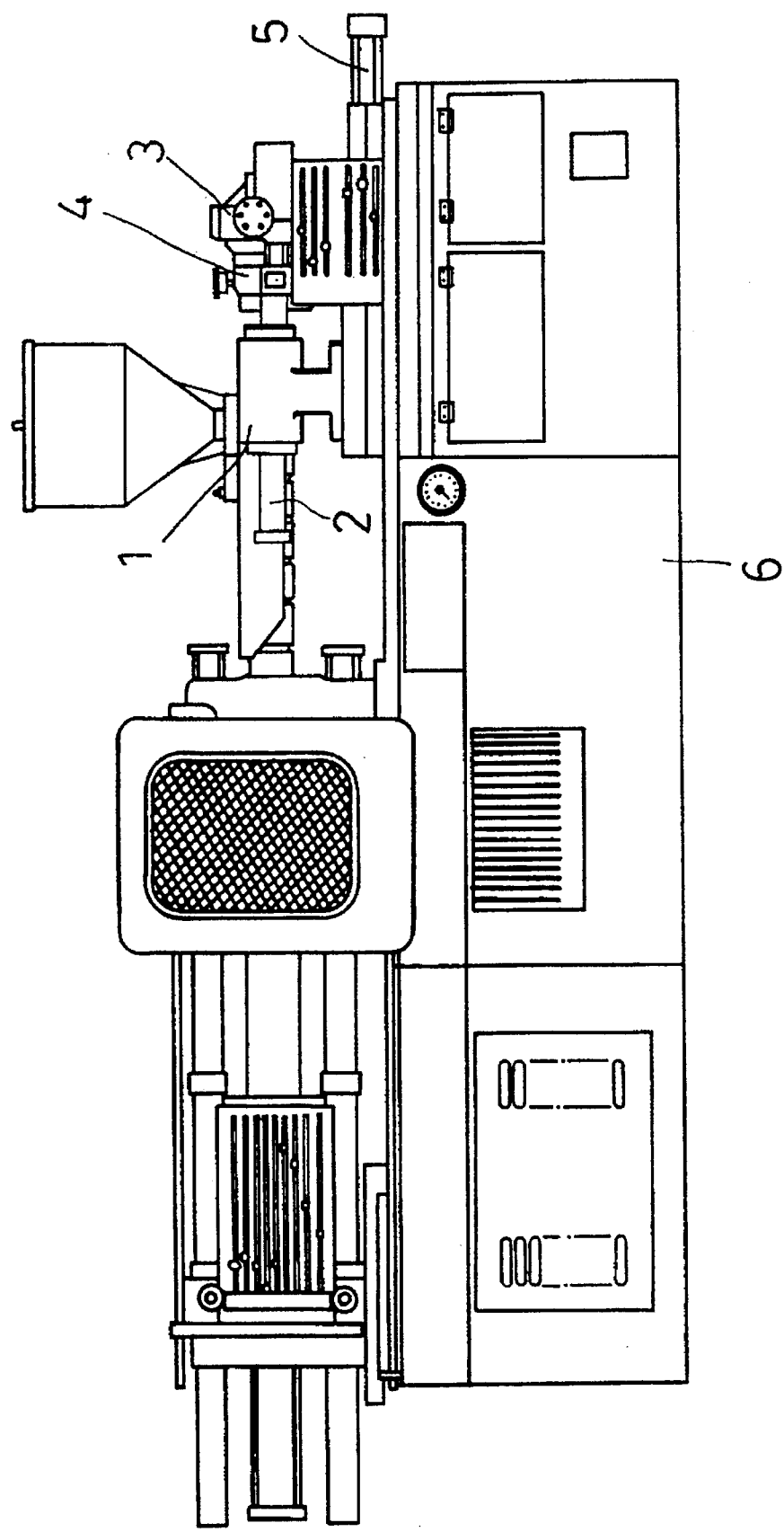

An arrangement of oil cylinders for a plastic injecting machine, as shown in FIGS. 2 and 3, has a large oil cylinder 2 and a small oil cylinder 2' respectively located on both a left and a right side of an oil cylinder base 1, with like sized oil cylinders being positioned diagonally from one another, and a bearing base 4 in a vertical position. All of the piston rods of the oil cylinders 2, 2' are connected to the oil cylinder base 1 to move at the same time. The four oil cylinders are arranged in accordance with the above description so as to keep movement of the oil cylinder base 1 and the bearing base 4 smooth and secured without the possibility of biasing. The four oil cylinders are driven by oil pumped by an oil pump so as to move synchronously to push a screw rod located in a material injecting cylinder connected to the oil cylinder base 1.

The four oil cylinders 2, 2' are arranged to be located a substantial distance from the material injecting cylinder 7, the cylinder 7 having electric heaters 71 fixed and disposed around an outer surface thereof. By that arrangement, the oil seals 21 contained in the four oil cylinders 2, 2' are not heated by the very hot heaters 71 during injecting operation. Then, by that arrangement, the oil seals 21 would be functioning under their normal temperature resistance of +95° C., and thereby able to maintain their normal service life, as compared to the shorter service life of those oil cylinders in a conventional plastic injecting machine, wherein the oil cylinders are usually located near the material injecting cylinder 7.

In addition, an oil route plate 22 is provided on the bearing base 4. Oil pipes formed of hard steel are secured on the oil route plate 22 that are connected to the four oil cylinders 2, 2' from an oil pump, so that oil flowing can be maintained smooth. Whereas, oil pipes of soft material are usually used in conventional plastic injecting machines, wherein an oil pressure motor 3 and oil cylinders are separately located on two sides. In the above described arrangement, oil pipes have to be very much longer than those used in conventional machines, thereby being much more expensive. So, the oil route plate 22 provided on the bearing base 4 can economize the cost of the oil pipes connected to the four oil cylinders 2, 2'.

While the preferred embodiments of the invention have been described above, it will be recognized and understood that various modifications may be made thereto and the appended claims are intended to cover all such modifications which may fall within the spirit and scope of the invention.

What is claimed is:

1. An apparatus having an arrangement of oil cylinders on a plastic injecting machine having a material injecting cylinder with electric heaters overlaying its surface and a screw rod within said material injecting cylinder, comprising:

an oil cylinder base connected to said screw rod and having opposing first and second sides;

a bearing base, said screw rod rotating in said bearing base; and, oil cylinder means coupled to said oil cylinder base and said bearing base for displacing said screw rod with respect to the material injecting cylinder, said oil cylinder means being disposed a sufficient distance from the electric heaters of the material injecting cylinder to avoid being heated thereby, said oil cylinder means including a pair of first oil cylinders of the same size and a pair of second oil cylinders of the same size, said second pair of oil cylinders being larger than said first pair of oil cylinders, one of said pair of first oil cylinders and one of said pair of second oil cylinders being located on said first side of said oil cylinder base and the other of said pair of first oil cylinders and the other of said pair of second oil cylinders being located on said second side of said oil cylinder base, said first and second pairs of oil cylinders respectively being diagonally located on said oil cylinder base.

* * * * *